US009827748B2

(12) United States Patent
Matsumura et al.

(10) Patent No.: US 9,827,748 B2
(45) Date of Patent: Nov. 28, 2017

(54) MULTILAYER PLATE

(71) Applicant: KURARAY CO., LTD., Kurashiki-shi (JP)

(72) Inventors: Atsushi Matsumura, Tainai (JP); Yusaku Nomoto, Tainai (JP); Toshiyuki Iguchi, Tainai (JP); Kazuo Funazaki, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 275 days.

(21) Appl. No.: 14/431,994

(22) PCT Filed: Sep. 27, 2013

(86) PCT No.: PCT/JP2013/005764

§ 371 (c)(1),
(2) Date: Mar. 27, 2015

(87) PCT Pub. No.: WO2014/050136

PCT Pub. Date: Apr. 3, 2014

(65) Prior Publication Data

US 2015/0239219 A1 Aug. 27, 2015

(30) Foreign Application Priority Data

Sep. 28, 2012 (JP) ................................ 2012-215774

(51) Int. Cl.

*B32B 27/08* (2006.01)
*B32B 27/36* (2006.01)
*B32B 27/30* (2006.01)
*B32B 7/02* (2006.01)
*C08F 220/18* (2006.01)
*C08F 220/14* (2006.01)

(52) U.S. Cl.

CPC ................ *B32B 27/08* (2013.01); *B32B 7/02* (2013.01); *B32B 27/308* (2013.01); *B32B 27/365* (2013.01); *C08F 220/14* (2013.01); *C08F 220/18* (2013.01); *B32B 2250/02* (2013.01); *B32B 2250/24* (2013.01); *B32B 2307/406* (2013.01); *B32B 2307/554* (2013.01); *B32B 2307/558* (2013.01); *B32B 2307/584* (2013.01); *B32B 2457/208* (2013.01); *Y10T 428/2495* (2015.01); *Y10T 428/24975* (2015.01); *Y10T 428/269* (2015.01); *Y10T 428/31507* (2015.04); *Y10T 428/31855* (2015.04)

(58) Field of Classification Search

CPC ......... B32B 7/02; B32B 27/08; B32B 27/308; B32B 27/365; C08F 220/14
See application file for complete search history.

(56) References Cited

U.S. PATENT DOCUMENTS

2007/0177262 A1 8/2007 Maekawa et al.
2011/0244242 A1 10/2011 Oguro et al.
2013/0059158 A1* 3/2013 Oguro .................... B32B 27/08 428/412
2015/0017408 A1* 1/2015 Aoki ...................... B32B 27/08 428/215

FOREIGN PATENT DOCUMENTS

JP EP 0470260 A1 * 2/1992 ............ C08F 220/14
JP 2003 221418 8/2003
JP 2007 185956 7/2007
JP 2009172953 A * 8/2009
JP WO 2011145630 A1 * 11/2011 ............ B32B 27/08
JP 2012 121271 6/2012
JP 2012 177979 9/2012
JP WO 2013125500 A1 * 8/2013 ............ B32B 27/08

OTHER PUBLICATIONS

"SABIC PC Polycarbonate Resin". SABIC Innovative Plastics, (2010); pp. 1-8.*
"Methacrylic Acid Esters: Methyl Methacrylate, N-Butyl Methacrylate". Retrieved Feb. 20, 2017; pp. 1-7.*
"MGC Polycarbonate Resin Sheet & Film General Guide". Mitsubishi Gas Chemical Company, Inc., (2008); pp. 1-8.*
Machine Translation of JP2009172953. Retrieved Feb. 20, 2017.*
International Search Report dated Dec. 24, 2013 in PCT/JP13/005764 filed Sep. 27, 2013.

* cited by examiner

*Primary Examiner* — Prashant J Khatri
(74) *Attorney, Agent, or Firm* — Oblon, McClelland, Maier & Neustadt, L.L.P.

(57) ABSTRACT

A multilayer plate, comprising a layer composed of a methacrylic resin comprising not less than 90% by mass of a structural unit derived from a methacrylic acid ester such as methyl methacrylate, methacrylic esters of a polycyclic aliphatic hydrocarbon and the like and having a glass transition temperature of 120 to 180° C., and a layer composed of a polycarbonate resin.

12 Claims, No Drawings

MULTILAYER PLATE

TECHNICAL FIELD

The present invention relates to a multilayer plate. More specifically, the present invention relates to a multilayer plate that is excellent in surface properties, is inhibited from warping due to residual stress, and is suitably used, for example, as a protective film for a touch panel.

BACKGROUND ART

A touch panel or a touchscreen is an electronic component composed of a combination of a display and a position detector. A touch on a touch panel with a finger or a pen can operate an electronic device. A touch panel is used, for example, in digital information equipment including ATMs at financial institutions such as banks, vending machines, mobile phones, personal digital assistants (PDAs), digital audio players, handheld game consoles, tablet personal computers, photocopiers, fax machines, car navigation systems and so on.

Input operation made via a touch panel sometimes leaves scratches on the surface and/or breaks the internal working due to the pressure applied. In order to prevent these, a touch panel is covered with a transparent protective plate on the surface of the touch panel. Protective plates made of tempered glass are widely used. And from the viewpoint of workability and weight reduction, protective plates made of a transparent resin are being researched. Such protective films are demanded to be lustrous, resistant to scratches, resistant to impact, and the like.

A polycarbonate resin is a resin suitable for use to produce a molded article excellent in impact resistance. A methacrylic resin is a resin suitable for use to produce a molded article that is highly lustrous and excellent in scratch resistance. When a polycarbonate resin and a methacrylic resin are subjected to heat melt molding at the same time (coextrusion, for example), a multilayer plate having a layer of the polycarbonate resin and a layer of the methacrylic resin can be produced. Heat melt molding of a resin, however, leaves a considerable amount of strain stress in the resulting molded article. The strain stress thus left in the molded article is called residual stress, and a molded article having residual stress warps and/or shrinks due to heat. Warpage due to residual stress presents a problem particularly in a molded article in a plate form, such as the multilayer plate. In order to decrease residual stress in a molded plate and inhibit warpage, a method is known where the rotation speed of a cooling roll used in extrusion is regulated (see Patent Document 1).

CITATION LIST

Patent Literature

Patent Document 1: JP 2007-185956 A

SUMMARY OF THE INVENTION

Problems to be Resolved by the Invention

In a multilayer plate, each resin layer has a different degree of residual stress. Because of this difference, when the rotation speed of a cooling roll is regulated in an attempt to decrease residual stress, a streak-like defect called a chatter mark can be formed on the surface of a molded article when the molded article is being separated from the cooling roll, leading to possible impairment to the surface properties. This presents a problem when using the multilayer plate as a protective film for a touch panel, for example.

An object of the present invention is to provide a multilayer plate that is excellent in surface properties, is inhibited from warping due to residual stress, and is suitably used, for example, as a protective film for a touch panel.

Means for Solving the Problems

The present inventors have conducted research to achieve the object and, as a result, completed the present invention that includes the following embodiments.

The present invention includes the following embodiments.

[1] A multilayer plate, comprising:

a layer composed of a methacrylic resin comprising not less than 90% by mass of a structural unit derived from a methacrylic acid ester and having a glass transition temperature of 120 to 180° C., and a layer composed of a polycarbonate resin.

[2] The multilayer plate according to [1], wherein the methacrylic resin comprises 40 to 90% by mass of a structural unit derived from methyl methacrylate.

[3] The multilayer plate according to [1] or [2], wherein the methacrylic resin comprises 10 to 60% by mass of a structural unit derived from a methacrylic acid ester (sometimes called a methacrylic acid ester (I)) represented by Formula (I):

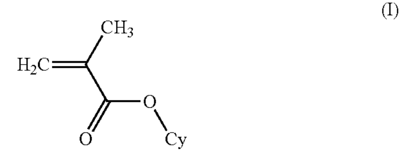

(I)

Cy in Formula (I) is an alicyclic hydrocarbon group. [4] The multilayer plate according to [3], wherein Cy in Formula (I) is a polycyclic aliphatic hydrocarbon group.

Advantageous Effects of the Invention

The multilayer plate of the present invention is excellent in surface properties and is inhibited from warping due to residual stress. The multilayer plate of the present invention is suitably used as a protective film for a touch panel where the film is demanded to be lustrous, resistant to scratches, and resistant to impact.

EMBODIMENTS FOR CARRYING OUT THE INVENTION

The multilayer plate of the present invention comprises a layer of a methacrylic resin (hereinafter, sometimes called a methacrylic resin layer) and a layer of a polycarbonate resin (hereinafter, sometimes called a polycarbonate resin layer).

The lower limit to the glass transition temperature of the methacrylic resin that constitutes the methacrylic resin layer is usually 120° C., preferably 125° C., and more preferably 130° C., while the upper limit to the glass transition temperature thereof is usually 180° C., preferably 165° C., more preferably 155° C., and further preferably 150° C. When the glass transition temperature of the methacrylic resin is within such a range, excellent surface properties are exhibited and luster, scratch resistance and impact resistance are also exhibited excellently.

The methacrylic resin comprises a structural unit derived from a methacrylic acid ester. The content of the structural unit derived from a methacrylic acid ester is usually not less than 90% by mass, preferably not less than 95% by mass, more preferably not less than 98% by mass, and most preferably 100% by mass. When the content of the structural unit derived from a methacrylic acid ester is within such a range, excellent luster is exhibited.

The methacrylic acid ester is represented by Formula (II):

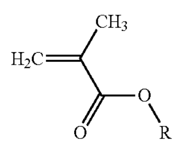

(II)

In Formula (II), R represents a hydrocarbon group, and the hydrocarbon group may be either a saturated hydrocarbon group or an unsaturated hydrocarbon group.

The hydrocarbon group R may be a non-cyclic aliphatic hydrocarbon group such as methyl group, ethyl group, propyl group and the like, an alicyclic hydrocarbon group, or an aromatic hydrocarbon group such as phenyl group. The methacrylic acid ester in which R is an alicyclic hydrocarbon group is the methacrylic acid ester (I).

Examples of the methacrylic acid ester (I) include methacrylic esters of a monocyclic aliphatic hydrocarbon, such as cyclohexyl methacrylate, cyclopentyl methacrylate, cycloheptyl methacrylate and the like; and methacrylic esters of a polycyclic aliphatic hydrocarbon, such as 2-norbornyl methacrylate, 2-methyl-2-norbornyl methacrylate, 2-ethyl-2-norbornyl methacrylate, 2-isobornyl methacrylate, 2-methyl-2-isobornyl methacrylate, 2-ethyl-2-isobornyl methacrylate, 8-tricyclo[5.2.1.$0^{2,6}$]decanyl methacrylate, 8-methyl-8-tricyclo[5.2.1.$0^{2,6}$]decanyl methacrylate, 8-ethyl-8-tricyclo[5.2.1.$0^{2,6}$]decanyl methacrylate, 2-adamantyl methacrylate, 2-methyl-2-adamantyl methacrylate, 2-ethyl-2-adamantyl methacrylate, 1-adamantyl methacrylate, 2-fenchyl methacrylate, 2-methyl-2-fenchyl methacrylate, 2-ethyl-2-fenchyl methacrylate and the like. Among these, methacrylic esters of a polycyclic aliphatic hydrocarbon are preferable, and 8-tricyclo[5.2.1.$0^{2,6}$]decanyl methacrylate is more preferable.

The methacrylic resin used in the present invention preferably comprises a structural unit derived from methyl methacrylate and a structural unit derived from methacrylic acid ester (I), more preferably comprises a structural unit derived from methyl methacrylate and a structural unit derived from a methacrylic ester of a polycyclic aliphatic hydrocarbon, and further preferably comprises a structural unit derived from methyl methacrylate and a structural unit derived from 8-tricyclo[5.2.1.$0^{2,6}$]decanyl methacrylate.

From the viewpoint of hardness, the methacrylic resin used in the present invention comprises the structural unit derived from methyl methacrylate preferably at 40 to 90% by mass, more preferably at 50 to 80% by mass, and further preferably at 60 to 70% by mass.

From the viewpoint of ensuring a glass transition temperature ranging from 120 to 180° C. and from the viewpoint of hygroscopicity, the methacrylic resin used in the present invention comprises the structural unit derived from methacrylic acid ester (I) preferably at 10 to 60% by mass, more preferably at 20 to 50% by mass, and further preferably at 30 to 40% by mass. When the methacrylic resin comprises 10 to 60% by mass of the structural unit derived from methacrylic acid ester (I), the glass transition temperature and the hygroscopicity thereof fall within approximately the same ranges as those of the polycarbonate resin and therefore the resulting multilayer plate is more effectively inhibited from warping due to residual stress and moisture absorbed. When the content of the structural unit derived from methacrylic acid ester (I) exceeds 60% by mass, the impact resistance of the methacrylic resin layer tends to decrease.

The methacrylic resin used in the present invention may contain a known additive in order to improve impact resistance, light resistance, or the like. Examples of the additive include an antioxidant, a thermal degradation inhibitor, an ultraviolet absorber, a light stabilizer, a lubricant, a mold release agent, a polymer processing aid, an antistatic agent, a flame retardant, a dye and a pigment, a light diffuser, an organic coloring agent, a matting agent, an impact resistance modifier, and a phosphor.

The polycarbonate resin used in the present invention is not particularly limited in producing method thereof. The polycarbonate resin can be obtained by interfacial polycondensation of a dihydric phenol and a carbonate precursor; a reaction via melt transesterification; a reaction via solid-phase transesterification of a carbonate prepolymer; or ring-opening polymerization of a cyclic carbonate compound, for example.

The polycarbonate resin used in the present invention has a melt volume-flow rate (MVR) of preferably 2 to 22 $cm^3$/10 minutes. When MVR is within such a range, heat melt molding proceeds in a consistent manner.

Preferably, the glass transition temperature of the polycarbonate resin used in the present invention is approximately the same with the glass transition temperature of the methacrylic resin. Specifically, $\Delta Tg$ that refers to the difference between the glass transition temperature of the polycarbonate resin and the glass transition temperature of the methacrylic resin is preferably not greater than 30° C. and more preferably not greater than 20° C. When these two glass transition temperatures are approximately the same with each other, warpage due to residual stress is inhibited more effectively.

The polycarbonate resin used in the present invention may contain a known additive in order to improve the light resistance or the like. Examples of the additive include an antioxidant, a thermal degradation inhibitor, an ultraviolet absorber, a light stabilizer, a lubricant, a mold release agent, a polymer processing aid, an antistatic agent, aflame retardant, a dye and a pigment, a light diffuser, an organic coloring agent, a matting agent, an impact resistance modifier, and a phosphor.

The layer configuration of the multilayer plate of the present invention is not particularly limited. Examples of the layer configuration include methacrylic resin layer/polycarbonate resin layer, methacrylic resin layer/polycarbonate resin layer/methacrylic resin layer, polycarbonate resin layer/methacrylic resin layer/polycarbonate resin layer, methacrylic resin layer/polycarbonate resin layer/methacrylic resin layer/polycarbonate resin layer/methacrylic resin layer and the like.

When the multilayer plate of the present invention is used as a protective film, the methacrylic resin layer preferably serves as the outermost layer from the surface to be protected (to-be-protected surface). Therefore, it is preferable to use a multilayer plate with the layer configuration of methacrylic resin layer /polycarbonate resin layer in an arrangement of methacrylic resin layer/polycarbonate resin layer/to-be-protected surface, or to use a multilayer plate with the layer configuration of methacrylic resin layer /polycarbonate resin layer/methacrylic resin layer in an arrangement of methacrylic resin layer/polycarbonate resin layer/methacrylic resin layer/to-be-protected surface, for example.

The thickness (the total thickness) of the multilayer plate of the present invention is preferably 0.4 to 2 mm, more preferably 0.5 to 1.5 mm, and further preferably 1.0 to 1.5 mm. When the thickness is too small, the rigidity tends to be inadequate, while the thickness that is too great tends to interfere with weight reduction of the resulting liquid crystal display or the like.

From the viewpoints of obtaining excellent surface properties, inhibiting warpage due to residual stress, and ensuring excellent surface hardness, excellent impact resistance, and weight reduction in good balance, $\Delta Tg \cdot d \cdot T^{-1}$ of the multilayer plate of the present invention is preferably not higher than 3.0 (° C.), more preferably not higher than 2.8 (° C.), and further preferably not higher than 2.5 (° C.), with T being the total thickness (μm) of the multilayer plate, d being the thickness (μm) of the methacrylic resin layer, and ΔTg being the difference (° C.) between the glass transition temperature of the polycarbonate resin and the glass transition temperature of the methacrylic resin.

As for the multilayer plate of the present invention, the thickness of the methacrylic resin layer is preferably 20 to 140 μm, more preferably 25 to 100 μm, and further preferably 25 to 70 μm.

In the multilayer plate of the present invention, the proportion ($d \cdot T^{-1}$) of the thickness of the methacrylic resin layer to the total thickness of the multilayer plate is preferably from 0.04 to 0.20, more preferably from 0.05 to 0.18, and further preferably from 0.06 to 0.15. When the above proportion of the thickness of the methacrylic resin layer is within such a range, warpage due to residual stress tends to be inhibited and the balance among surface hardness, impact resistance, and performance in weight reduction tends to be further improved.

The method for producing the multilayer plate of the present invention is not particularly limited, and from the productivity viewpoint, is preferably coextrusion of the polycarbonate resin and the methacrylic resin.

EXAMPLES

The present invention will be described in more detail by examples. The scope of the present invention is, however, not limited by these examples.

The properties of a resin and a multilayer plate were measured by the following methods.

[Glass Transition Temperature]

A resin at an amount of 10 mg was sealed in an aluminum pan, and measurement was performed with the use of a differential scanning calorimeter ("DSC-50", manufactured by Rigaku Corporation) in conformity with JIS-K7121 under conditions of a nitrogen gas stream at 10 ml/min and of 10° C./min. The glass transition temperature in the present specification referred to the midpoint glass transition temperature defined in JIS-K7121.

[MVR]

Measurement was performed using a melt indexer ("TAKARA L241-153", manufactured by Techno Seven Co., Ltd.) in conformance with JIS-K7210.

[Increment in Warpage]

From a multilayer plate obtained by coextrusion, a square plate for test with a size of 500 mm×500 mm was cut out so that the one edge side of the square plate was parallel to the extrusion direction. Slinging threads were attached to the edge side parallel to the extrusion direction at points of ⅓ and ⅔ lengths of the edge side parallel to the extrusion direction. The square plate was hanged with the slinging threads so that the edge side parallel to the extrusion direction stayed horizontal. A measuring thread was attached to the both edge sides of the square plate orthogonal to the extrusion direction at point of ½ length of the each edge side, in a way that the measuring thread stretched across the square plate. The distance between the midpoint of the measuring thread and the surface of the square plate was measured, which was to serve as the degree (mm) of warpage before heating.

Then, the square plate was placed in a thermostat set at a predetermined temperature and was left there for 24 hours. The square plate was then taken out of the thermostat and the distance was measured in the same way as above, which was to serve as the degree (mm) of warpage after heating. The temperature of the thermostat was set at 100° C. or 110° C., and the test was performed under both temperature conditions.

The difference between the degree of warpage before heating and the degree of warpage after heating was defined as an increment (mm) in warpage due to heating.

[Surface Properties]

The surface of a multilayer plate at the methacrylic resin-layer side was observed by the naked eye in a room equipped with a fluorescent lamp to evaluate the surface properties based on the following criteria:

A: no chatter marks observed on the surface of the methacrylic resin-layer side, B: chatter marks observed, but not highly visible, on the surface of the methacrylic resin-layer side, C: chatter marks observed highly visible on the surface of the methacrylic resin-layer side.

[Surface Hardness]

Measurement was performed for the surface of a multilayer plate at the methacrylic resin-layer side in conformance with JIS-K5600-5-4, and the surface hardness was evaluated by the pencil hardness test.

[Impact Resistance]

From a multilayer plate obtained by extrusion, a rectangle with its side parallel to the extrusion direction measuring 70 mm and its side orthogonal to the extrusion direction measuring 100 mm was cut out, which was to serve as a specimen.

Toward the center of the surface of the specimen at the methacrylic resin-layer side, a steel ball with a diameter of 30 mm and mass of 112 g was let to fall freely from a height of 1 m. Cracks, if any, of the specimen were observed by the naked eye to evaluate the impact resistance based on the following criteria:

B: cracks observed that passed through the specimen in the thickness direction,

A: no cracks observed that passed through the specimen in the thickness direction.

[Methacrylic Resin]

A copolymer obtained by radical polymerization of methyl methacrylate and 8-tricyclo[5.2.1.0$^{2,6}$]decanyl methacrylate was used as a methacrylic resin.

The ratio (mass percentage) of 8-tricyclo[$5.2.1.0^{2,6}$]decanyl methacrylate in the sum of methyl methacrylate and 8-tricyclo[$5.2.1.0^{2,6}$]decanyl methacrylate is sometimes called a TC ratio.

[Polycarbonate Resin]

A "PCX" (MVR: 8 $cm^3$/10 minutes (300° C./1.2 kg), glass transition temperature: 150° C.) manufactured by Sumika Styron Polycarbonate Limited was used as a polycarbonate resin.

Example 1

A methacrylic resin having a TC ratio of 35% by mass (MVR: 2 $cm^3$/10 minutes (230° C./3.8 kg), glass transition temperature: 130° C.) and the polycarbonate resin were subjected to coextrusion at a rate of 4 m/minute to produce a multilayer plate comprising a 70-μm-thick methacrylic resin layer and a 930-μm-thick polycarbonate resin layer and having a total thickness of 1000 μm. The results of evaluation are shown in Table 1.

Example 2

A multilayer plate was produced in the same manner as in Example 1 except that, instead of the methacrylic resin having a TC ratio of 35% by mass, a methacrylic resin having a TC ratio of 20% by mass (MVR: 2 $cm^3$/10 minutes (230° C./3.8 kg), glass transition temperature: 120° C.) was used. The results of evaluation are shown in Table 1.

Example 3

A multilayer plate was produced in the same manner as in Example 1 except that, instead of the methacrylic resin having a TC ratio of 35% by mass, a methacrylic resin having a TC ratio of 60% by mass (MVR: 2 $cm^3$/10 minutes (230° C./3.8 kg), glass transition temperature: 150° C.) was used. The results of evaluation are shown in Table 1.

Example 4

A multilayer plate comprising a 20-μm-thick methacrylic resin layer and a 980-μm-thick polycarbonate resin layer and having a total thickness of 1000 μm was produced in the same manner as in Example 1 except that the amounts of the methacrylic resin and the polycarbonate resin extruded were changed. The results of evaluation are shown in Table 1.

Example 5

A multilayer plate comprising a 25-μm-thick methacrylic resin layer and a 975-μm-thick polycarbonate resin layer and having a total thickness of 1000 μm was produced in the same manner as in Example 1 except that the amounts of the methacrylic resin and the polycarbonate resin extruded were changed. The results of evaluation are shown in Table 1.

Example 6

A multilayer plate comprising a 70-μm-thick methacrylic resin layer and a 430-μm-thick polycarbonate resin layer and having a total thickness of 500 μm was produced in the same manner as in Example 1 except that the amounts of the methacrylic resin and the polycarbonate resin extruded were changed and the gap between the rolls used for extrusion was changed. The results of evaluation are shown in Table 1.

Example 7

A multilayer plate comprising a 150-μm-thick methacrylic resin layer and an 850-μm-thick polycarbonate resin layer and having a total thickness of 1000 μm was produced in the same manner as in Example 1 except that the amounts of the methacrylic resin and the polycarbonate resin extruded were changed. The results of evaluation are shown in Table 1.

Example 8

A multilayer plate comprising a 150-μm-thick methacrylic resin layer and a 1350-μm-thick polycarbonate resin layer and having a total thickness of 1500 μm was produced in the same manner as in Example 1 except that the amounts of the methacrylic resin and the polycarbonate resin extruded were changed and the gap between the rolls used for extrusion was changed. The results of evaluation are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| methacrylic resin | TC ratio [%] | 35 | 20 | 60 | 35 | 35 | 35 | 35 | 35 |
| | Glass transition temperature [° C.] | 130 | 120 | 150 | 130 | 130 | 130 | 130 | 130 |
| Glass transtion temperature of polycarbonate resin [° C.] | | 150 | 150 | 150 | 150 | 150 | 150 | 150 | 150 |
| ΔTg [° C.] | | 20 | 30 | 0 | 20 | 20 | 20 | 20 | 20 |
| Thickness of multilayer plate T [μm] | | 1000 | 1000 | 1000 | 1000 | 1000 | 500 | 1000 | 1500 |
| Thickness of methacrylic resin layer d [μm] | | 70 | 70 | 70 | 20 | 25 | 70 | 150 | 150 |
| Proportion of thickness of methacrylic resin layer $d \cdot T^{-1}$ | | 0.070 | 0.070 | 0.070 | 0.020 | 0.025 | 0.140 | 0.150 | 0.100 |
| $\Delta Tg \cdot d \cdot T^{-1}$ [° C.] | | 1.4 | 2.1 | 0.0 | 0.4 | 0.5 | 2.8 | 3.0 | 2.0 |
| Thickness of polycarbonate resin layer [μm] | | 930 | 930 | 930 | 980 | 975 | 430 | 850 | 1350 |
| Surface properties | | A | B | A | A | A | A | A | A |
| Increment in warpage (100° C. × 24 hr) [mm] | | 0 | 0 | 0 | 0 | 0 | 0 | 0 | 0 |
| Increment in warpage (110° C. × 24 hr) [mm] | | 3 | 6 | 0 | 0 | 0 | 7 | 8 | 4 |

TABLE 1-continued

| | Example | | | | | | | |
|---|---|---|---|---|---|---|---|---|
| | 1 | 2 | 3 | 4 | 5 | 6 | 7 | 8 |
| Impact resistance | A | A | A | A | A | A | B | B |
| Pencil hardness | 2 H | 2 H | 2 H | F | 2 H | 2 H | 2 H | 2 H |

Example 9

A multilayer plate comprising a 100-μm-thick methacrylic resin layer and a 900-μm-thick polycarbonate resin layer and having a total thickness of 1000 μm was produced in the same manner as in Example 2 except that the amounts of the methacrylic resin and the polycarbonate resin extruded were changed. The results of evaluation are shown in Table 2.

Example 10

A multilayer plate comprising a 70-μm-thick methacrylic resin layer and a 1430-μm-thick polycarbonate resin layer and having a total thickness of 1500 μm was produced in the same manner as in Example 2 except that the amounts of the methacrylic resin and the polycarbonate resin extruded and the gap between the rolls used for extrusion were changed. The results of evaluation are shown in Table 2.

Example 11

A multilayer plate comprising a 100-μm-thick methacrylic resin layer and a 400-μm-thick polycarbonate resin layer and having a total thickness of 500 μm was produced in the same manner as in Example 6 except that the amounts of the methacrylic resin and the polycarbonate resin extruded were changed. The results of evaluation are shown in Table 2.

Example 12

A multilayer plate comprising a 25-μm-thick methacrylic resin layer and a 475-μm-thick polycarbonate resin layer and having a total thickness of 500 μm was produced in the same manner as in Example 2 except that the amounts of the methacrylic resin and the polycarbonate resin extruded and the gap between the rolls used for extrusion were changed. The results of evaluation are shown in Table 2.

Example 13

A multilayer plate comprising a 70-μm-thick methacrylic resin layer and a 430-μm-thick polycarbonate resin layer and having a total thickness of 500 μm was produced in the same manner as in Example 12 except that the amounts of the methacrylic resin and the polycarbonate resin extruded were changed. The results of evaluation are shown in Table 2.

Example 14

A multilayer plate comprising a 150-μm-thick methacrylic resin layer and a 1350-μm-thick polycarbonate resin layer and having a total thickness of 1500 μm was produced in the same manner as in Example 12 except that the amounts of the methacrylic resin and the polycarbonate resin extruded and the gap between the rolls used for extrusion were changed. The results of evaluation are shown in Table 2.

Comparative Example 1

A multilayer plate was produced in the same manner as in Example 1 except that, instead of the methacrylic resin having a TC ratio of 35% by mass, a methacrylic resin having a TC ratio of 15% by mass (MVR: 2 $cm^3$/10 minutes (230° C./3.8 kg), glass transition temperature: 115° C.) was used. The results of evaluation are shown in Table 2.

Comparative Example 2

A multilayer plate was produced in the same manner as in Example 1 except that, instead of the methacrylic resin having a TC ratio of 35% by mass, a methyl methacrylate homopolymer (MVR: 2 $cm^3$/10 minutes (230° C./3.8 kg), glass transition temperature: 103° C.) was used. The results of evaluation are shown in Table 2.

Reference Example

An attempt was made to produce a multilayer plate in the same manner as in Example 1 except that, instead of the methacrylic resin having a TC ratio of 35% by mass, a methacrylic resin having a TC ratio of 65% by mass (MVR: 2 $cm^3$/10 minutes (230° C./3.8 kg), glass transition temperature: 155° C.) was used. However, production failed because cracks occurred during extrusion.

TABLE 2

| | | Example | | | | | | Comp. Ex. | |
|---|---|---|---|---|---|---|---|---|---|
| | | 9 | 10 | 11 | 12 | 13 | 14 | 1 | 2 |
| methacrylic resin | TC ratio [%] | 20 | 20 | 35 | 20 | 20 | 20 | 15 | 0 |
| | Glass transition temperature [° C.] | 120 | 120 | 130 | 120 | 120 | 120 | 115 | 103 |
| Glass transtion temperature of polycarbonate resin [° C.] | | 150 | 150 | 150 | 150 | 150 | 150 | 150 | 150 |
| ΔTg [° C.] | | 30 | 30 | 20 | 30 | 30 | 30 | 35 | 47 |
| Thickness of multilayer plate T [μm] | | 1000 | 1500 | 500 | 500 | 500 | 1500 | 1000 | 1000 |
| Thickness of methacrylic resin layer d [μm] | | 100 | 70 | 100 | 25 | 70 | 150 | 70 | 70 |

TABLE 2-continued

| | Example | | | | | | Comp. Ex. | |
|---|---|---|---|---|---|---|---|---|
| | 9 | 10 | 11 | 12 | 13 | 14 | 1 | 2 |
| Proportion of thickness of methacrylic resin layer $d \cdot T^{-1}$ | 0.100 | 0.047 | 0.200 | 0.050 | 0.140 | 0.100 | 0.070 | 0.070 |
| $\Delta Tg \cdot d \cdot T^{-1}$ [° C.] | 3.0 | 1.4 | 4.0 | 1.5 | 4.2 | 3.0 | 2.5 | 3.3 |
| Thickness of polycarbonate resin layer [μm] | 900 | 1430 | 400 | 475 | 430 | 1350 | 930 | 930 |
| Surface properties | B | B | A | B | B | B | C | C |
| Increment in warpage (100° C. × 24 hr) [mm] | 0 | 0 | 5 | 0 | 6 | 0 | 0 | 10 |
| Increment in warpage (110° C. × 24 hr) [mm] | 10 | 4 | 20 | 3 | 22 | 10 | 7 | 20 |
| Impact resistance | B | A | B | A | A | B | A | A |
| Pencil hardness | 2 H | 2 H | 2 H | 2 H | 2 H | 2 H | 2 H | 2 H |

As shown in the results above, when a methacrylic resin comprising not less than 90% by mass of a structural unit derived from a methacrylic acid ester and having a glass transition temperature of 120 to 180° C. is used according to the present invention, a multilayer plate with excellent surface properties and a small increment in warpage is obtained (see Example 1, 2, or 3 and Comparative Example 1 or 2). It has been proven that the surface hardness of the multilayer plate of the present invention is further improved when the thickness of the methacrylic resin layer is not less than 25 μm, while the impact resistance thereof is further improved when the thickness of the methacrylic resin layer is not more than 70 μm (see Examples 1, 4, 5, 7, and 9). It has been proven that the impact resistance of the multilayer plate of the present invention is further improved as the thickness of the methacrylic resin layer decreases provided that the proportion ($d \cdot T^{-1}$) of the thickness of the methacrylic resin layer remains approximately the same (see Examples 6 and 7). It has also been proven that warpage of the multilayer plate of the present invention particularly at 110° C. is further inhibited at a small $\Delta Tg \cdot d \cdot T^{-1}$ (see Examples 6 and 11, Examples 10 and 13, or Examples 12 and 14). The multilayer plates of the present invention have almost the same physical properties particularly when the total thickness, T, of each is within the range of 1000 μm to 1500 μm (see Examples 1 and 6 and Examples 2 and 10).

INDUSTRIAL APPLICABILITY

The multilayer plate of the present invention is suitably used, for example, as a protective film for a touch panel.

The invention claimed is:

1. A multilayer plate, comprising:

a layer comprising a methacrylic resin comprising not less than 90% by mass of a structural unit derived from a methacrylic acid ester and having a glass transition temperature of 120 to 180° C.; and a layer comprising a polycarbonate resin;

wherein the methacrylic resin comprises 20 to 60% by mass of a structural unit derived from a methacrylic acid ester represented by Formula (I):

(I)

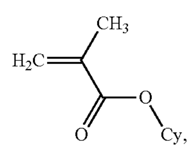

wherein Cy is an alicyclic hydrocarbon group; and wherein $\Delta Tg \cdot d \cdot T^{-1}$ is not higher than 3.0[° C.], with T being a total thickness [μm] of the multilayer plate, d being a thickness [μm] of the methacrylic resin layer, and ΔTg being a difference [°C.] between a glass transition temperature of the polycarbonate resin and a glass transition temperature of the methacrylic resin.

2. The multilayer plate according to claim 1, wherein the methacrylic resin further comprises 40 to 80% by mass of a structural unit derived from methyl methacrylate.

3. The multilayer plate according to claim 1, wherein Cy in Formula (I) is a polycyclic aliphatic hydrocarbon group.

4. The multilayer plate according to claim 1, wherein Cy in Formula (I) is 8-tricyclo[$5.2.1.0^{2,6}$]decanyl.

5. The multilayer plate according to claim 1, wherein the polycarbonate resin has a melt volume-flow rate (MVR) of 2 to 22 $cm^3$/10 minutes.

6. The multilayer plate according to claim 1, wherein the difference between the glass transition temperature of the polycarbonate resin and the glass transition temperature of the methacrylic resin is not greater than 30° C.

7. The multilayer plate according to claim 1, having a layer configuration selected from the group consisting of:

the methacrylic resin layer/the polycarbonate resin layer, the methacrylic resin layer/the polycarbonate resin layer/the methacrylic resin layer, the polycarbonate resin layer/the methacrylic resin layer/the polycarbonate resin layer, and the methacrylic resin layer/the polycarbonate resin layer/the methacrylic resin layer/the polycarbonate resin layer/the methacrylic resin layer.

8. The multilayer plate according to claim 1, wherein the total thickness is 0.4 to 2 mm.

9. The multilayer plate according to claim 1, wherein the thickness of the methacrylic resin layer is 20 to 140 μm.

10. The multilayer plate according to claim 1, wherein a proportion $d \cdot T^{-1}$ of the thickness of the methacrylic resin layer to the total thickness of the multilayer plate is from 0.04 to 0.20.

11. The multilayer plate according to claim 1, wherein the methacrylic resin comprises 20 to 50% by mass of the structural unit derived from the methacrylic acid ester represented by Formula (I).

12. The multilayer plate according to claim 1, wherein a proportion $d \cdot T^{-1}$ of the thickness of the methacrylic resin layer to the total thickness of the multilayer plate is from 0.04 to 0.15.

* * * * *